United States Patent [19]

Chang

[11] Patent Number: 5,293,766

[45] Date of Patent: Mar. 15, 1994

[54] METHOD FOR MAKING SLENDER SEAMLESS STEEL MOLD

[76] Inventor: Fu-Hsing Chang, No. 293, Min Tsu I Road, Kauhsiung, Taiwan

[21] Appl. No.: 5,253

[22] Filed: Jan. 19, 1993

[51] Int. Cl.$^5$ .............................................. B21D 51/16
[52] U.S. Cl. ......................................... 72/283; 164/6
[58] Field of Search .................. 164/6; 72/283, 276, 72/286, 342.7, 342.1

[56] References Cited

U.S. PATENT DOCUMENTS

| | | | |
|---|---|---|---|
| 2,104,319 | 1/1938 | Dicke | 72/276 |
| 3,646,799 | 3/1972 | Kipp et al. | 164/6 |
| 4,270,690 | 6/1981 | Mabery et al. | 72/283 |
| 5,018,378 | 5/1991 | Maier et al. | 72/283 |

*Primary Examiner*—Paula A. Bradley
*Assistant Examiner*—Erik R. Puknys
*Attorney, Agent, or Firm*—Pro-Techtor International

[57] ABSTRACT

A method for making slender seamless steel mold is disclosed, wherein the outer surface of a solid slender male mold is first chased with concave and convex stripes. Then, the male mold is hardened and fitted into a hollow female mold which has not been gone through hardening process. Thereafter, a hydraulic pressure is exerted onto the outer surface of the female mold so as to impress the concave and convex of the male mold onto the inner surface of the female mold. Then the male mold is annealed and drilled with a longitudinal through hole. At least three longitudinal slits are cut on the wall of the through hole in an outward direction. Finally, the male and female molds are together heat-treated and put into water with normal temperature in order to create fissures at the slit portions of the male mold and crack the male mold into pieces. Consequently, a slender seamless steel mold having inner surface formed with concave and convex stripes is completely made.

8 Claims, 2 Drawing Sheets

METHOD FOR MAKING SLENDER SEAMLESS STEEL MOLD

BACKGROUND OF THE INVENTION

The present invention relates to a method for making slender seamless steel mold, and more particularly to a method for making seamless steel mold for manufacturing a grip sleeve of a golf club.

It is known that a general solid plastic conic article or cylindrical article is molded by an upper mold and an opposite lower mold detachably associated therewith. When a hollow conic article or cylindrical article is molded, an additional pin member must be disposed through the cavity defined by the upper and lower molds as shown in FIG. 8A. A sleeve member H having a through hole h as shown in FIG. 8B is molded in such a manner that a pin member P is disposed in a cavity R between the upper and lower molds M1, M2 of FIG. 8A to define an annular space. The plastic material is injected into the cavity from an injection gate S to form the sleeve H as shown in FIG. 8B. The thickness of the sleeve H is determined by the diameter of the pin member P. However, in general, the length of the pin member is much larger than the diameter thereof so that when suffering the strong injection force during the material injection process, the pin member P tends to deform into a curved configuration shown by the phantom lines in FIG. 8A. Even if the injection gate S is located at a not center portion, the pin member P will be inevitably curved. As a result, the through hole of the product will be eccentrical and the thickness of the wall thereof will be disunified. With reference to FIG. 8C, respecting the molding process of a basically hollow conic grip sleeve of a golf club, an upper and a lower molds are detachably joined during the molding process. After the molding process is completed, the upper and lower molds are separated for taking out the preliminary product of the grip sleeve as shown in FIG. 8C. The product has many rough edges T1-T5 at the seams L, L1, L2 formed by the joint between the molds. The portion with such seams and rough edges must be sanded and polished many times in subsequent processing. Consequently, the manufacturing cost will be greatly increased due to the labor in such processing. Moreover, the grip of the golf club is always chased with stripes and figures for the practice and appearance purposes. Such stripes and figures are often somewhat damaged during the sanding and polishing operation. Therefore, a grip with high quality can be hardly achieved.

It is known from the above that it is the only way to solve the aforesaid problems and manufacture a grip with high quality to substitute the conventional steel molds for molding the grip sleeve with a seamless steel mold. However, it is extremely difficult to make a slender seamless steel mold, not to mentioned chasing discontinuous and irregular concave and convex stripes or figures on the inner surface of a long slender tube with a length of 270 mm and an inner diameter of 14.5 mm. Even the most advanced CNC lathe at present can only operate on a plane-to-plane basis. Although the rifle line is chased in the gun barrel, the rifle line is a regular simple continuous curve. In contrast therewith, the stripes and figures of the grip sleeve of a golf club are discontinuous and irregular, so that the chasing method of the rifle line cannot be applied to the grip sleeve of a golf club.

SUMMARY OF THE INVENTION

It is therefore a primary object of this invention to provide a method for making hollow slender seamless steel mold which can mold product without creating any rough edge and make the stripes or figures of the outer surface of the product aligned with and flush with one another without any seam.

It is a further object of this invention to provide the above method, wherein the product processing operation such as sanding and polishing are totally eliminated and the labor cost is greatly lowered.

The present invention can be best understood through the following description and accompanying drawings, wherein:

DETAILED DESCRIPTION OF THE PREFERRED EMBODIMENTS

The method for making slender seamless steel mold of this invention can be applied to form discontinuous and irregular concave stripes on the inner surfaces of slender members. The aforesaid slender members can be a circular sleeve, an elliptic sleeve, a conic sleeve, a triangular sleeve, a square sleeve and other polygonal sleeves. For the purpose of facilitation, the circular sleeve is examplified hereinafter to illustrate the molding method of this invention. In practical application, the male mold of this invention is formed of highly carbonized steel which is easy to crack, while the female mold is formed of flexible heat-resistant steel.

The main technical measures of the molding method of this invention are described as follows:

a. First, the outer surface of a solid cylindrical steel member serving as the male mold is chased with the required stripes. Then the male mold is heated and hardened to a required hardness.

b. Then, the male mold is inserted into a hollow cylindrical steel member serving as the female mold. The inner diameter of the female mold is identical to or corresponding to the outer diameter of the male mold.

c. A hydraulic pressure is exerted onto the outer surface of the female mold which is fitted with the male mold so as to impress the hardened stripes of the outer surface of the male mold onto the inner surface of the female mold which has not been gone through hardening process.

d. The entire male and female molds are heated to an anneal temperature and then the same is cooled naturally. When the male mold is annealed to the original hardness, the male mold is drilled with a central through hole over its entire length. The dimension of the through hole is determined in consideration of the following cutting process.

e. At least three longitudinal slits are cut in an outward direction on the wall of the through hole of the male mold. The depth of each slit is smaller than the thickness of the male of the through hole of the male mold.

f. After the slits are cut, the male mold and the female mold are together heat-treated and then are put into water with normal temperature, so that the slit sections of the male mold deform and crack into pieces. The pieces can be removed from the inner hole of the female mold to show up the stripes impressed on the inner surface of the female mold by the male mold. Consequently, the molding process of a seamless steal female mold the inner surface of which is knurled with stripes is completed.

Figure 1:
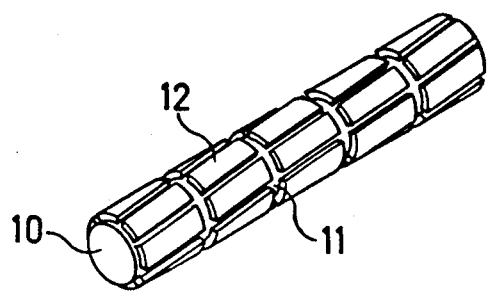
FIG. 1 is a perspective view of one embodiment of the male mold of this invention.
Figure 2:
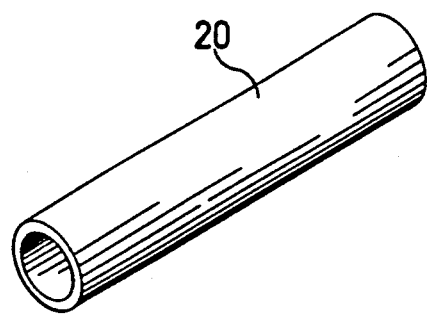
FIG. 2 is a perspective view of a female mold cooperating with the male mold by FIG. 1.

In a preferred embodiment of this invention, the molding process is applied to a molding steel mold for a grip sleeve of a golf club as follows:

A solid conic steel member having a dimension corresponding to that of a grip sleeve is used as the male mold 10 as shown in FIG. 1. The male mold 10 is formed of any highly carbonized steel materials which are easy to crack, such as SK3. The outer surface of the male mold 10 is first chased with concave stripes 11 and convex portions 12 and then the male mold 10 is heated and hardened to a hardness of about 60-65 HRC. Then, a hollow conic member 20 as shown in FIG. 2 is used as the female mold. The female mold 20 is made of relatively flexible heat-resistant steel or middle carbonized steel such as 45C steel material which has not been gone through heat treatment. The inner diameter of the female mold 20 is corresponding to the outer diameter of the male mold 10. The male mold 10 is then fitted into the female mold 20.

Figure 3:
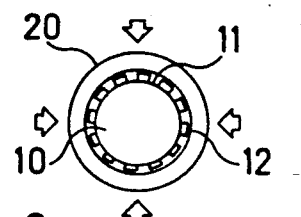
FIG. 3 is a front elevation of the fitted male and female molds wherein the hydraulic pressure is exerted on the outer surface of the female mold.
Figure 4A:
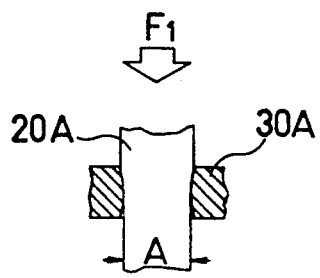
FIGS. 4A-4C illustrate one embodiment of the exertion of hydraulic pressure on the outer surface of the female mold.
Figure 4B:
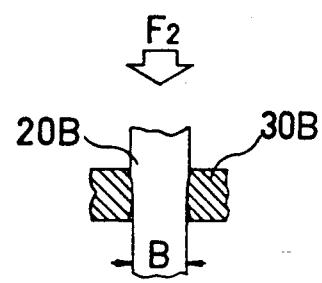
Figure 4C:
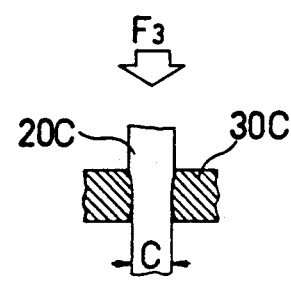
Figure 5:
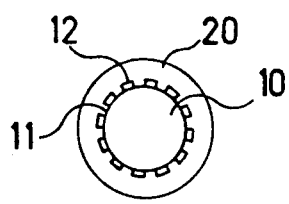
FIG. 5 shows that after the exertion of hydraulic pressure on the male and female molds is completed, the stripes of the outer surface of the male mold are impressed on the inner surface of the female mold.

A hydraulic pressure is evenly exerted onto the extire outer surface of the female mold which is fitted with the male mold so as to impress the hardened concave and convex stripes 11, 12 of the outer surface of the male mold onto the inner surface of the female mold 20. In a preferred embodiment of this invention, as shown in FIGS. 3 and 4, the hydraulic pressure is exerted in such a manner than an eye mold 30A-30C with tapered diameter is pushed downwardly by hydraulic force F1-F3 in order to compress the female mold 20 and gradually reduce the outer diameter of the female mold 20 from A to C. By means of such hydraulic force, the stripes of the male mold 10 are totally impressed onto the inner surface of the female mold 20 as shown in FIG. 5.

Figure 6:
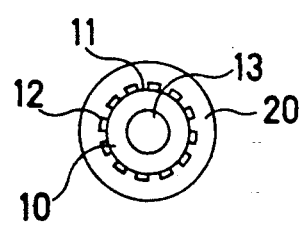
FIG. 6 is a front elevation of the male mold after drilled with a central through hole.
Figure 7A:
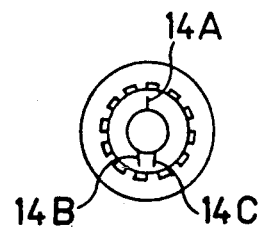
FIGS. 7A-7C show three embodiments of three or four slits cut on the wall of the through hole of the male mold.
Figure 7B:
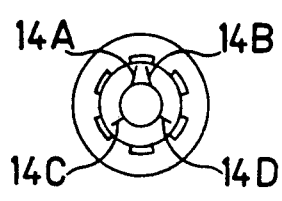
Figure 7C:
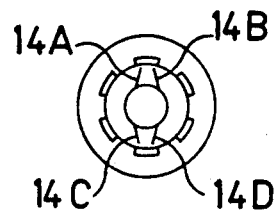
Figure 7D:
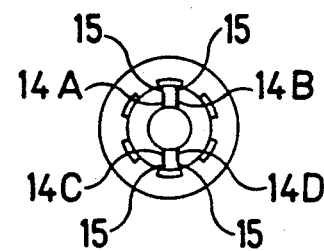
FIG. 7D shows that the male mold cracks after heat-treated.
Figure 8A:
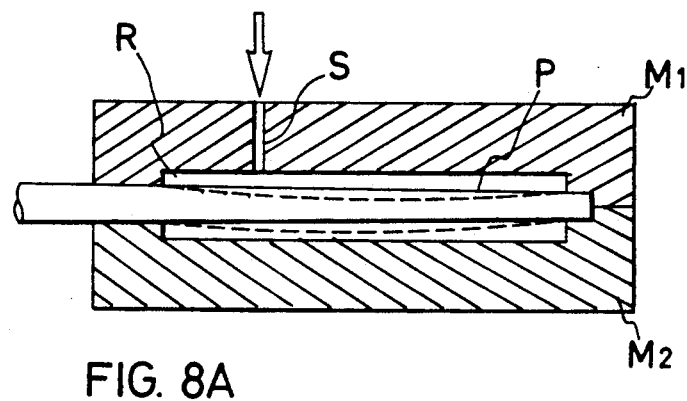
FIG. 8A is a sectional view according to FIG. 8A.
Figure 8B:
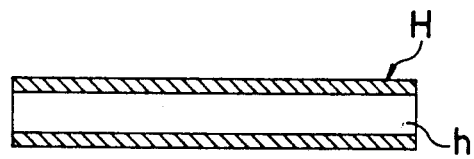
FIG. 8B shows a preliminary product of a grip sleeve of a golf club.
Figure 8C:
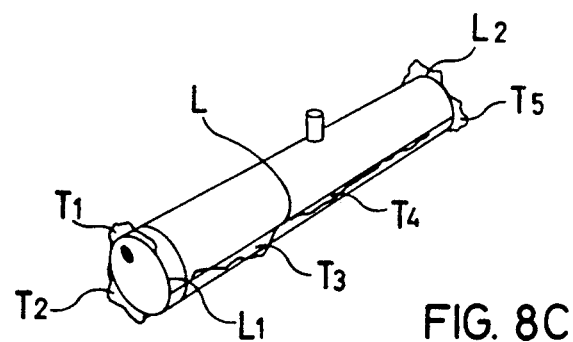
FIG. 8C shows that the mold arrangement for molding a general sleeve article.

Subsequently, the male and female molds are together heated. Especially, the male mold 10 is annealed with respect to the steel material nature thereof, i.e., the male mold 10 is heated to the temper temperature of about 780° C. and then cooled naturally so as to anneal to the original hardness. Thereafter, the male mold 10 is drilled with a longitudinal through hole 13 over its entire length as shown in FIG. 6.

At least three longitudinal slits 14A-14D are cut on the wall of the through hole 13 of the male mold 10 in an outward direction as shown in FIG. 7. The depth of each slit is smaller than the thickless of the wall of the through hole 13 so as to avoid damage of the stripes impressed on the inner surface of the female mold.

Finally, the male and female molds are together heat-treated at over 860° C. temperature, and then put into water with normal temperature. At this time, by such chilling process, on the one hand, the female mold is hardened to a required hardness, while on the other hand, the male mold which is made of easily crackable highly carbonized steel cracks at the slits 14A-14D with fissures 15 created at the joint between the male and female molds. Then, the cracked male mold can be easily released from the tight association with the female mold and removed therefrom. It should be noted that in the preferred embodiments of this invention, two slits of the at least three slits are very close to each other such as the slits 14B, 14C in FIG. 7A, the slits 14A, 14B in FIG. 7B and the slits 14A, 14B and 14C, 14D in FIG. 7C. It can be seen from FIG. 7D that the area adjacent to the two close slits more tend to crack into pieces after the heat treatment. After the short arch piece between the two close slits 14B, 14C drops, the long arch pieces between the slits 14A, 14B and 14C can be easily removed. Consequently, the male mold 10 can be totally detached from the female mold 20 to keep the stripes on the inner surface of the female mold complete.

What is claimed is:

1. A method for making slender seamless steel mold, comprising the following steps:

(a) chasing an outer surface of a solid slender male mold with required stripes and then heat-treating and hardening said male mold to a required hardness;

(b) fitting said male mold into a hollow slender female mold which has an outer surface and an inner surface having an inner diameter corresponding to the outer diameter of said male mold;

(c) exerting a hydraulic pressure onto the outer surface of said female mold which is fitted with said male mold so as to impress the stripes of the outer surface of said male mold onto the inner surface of said female mold;

(d) heating said fitted male and female molds to an anneal temperature and then making the same cool naturally and thereafter drilling a longitudinal through hole the length of said male mold, thus defining a wall of said male mold having an inner surface;

(e) cutting at least three longitudinal slits on the inner surface of said male mold, the depth of each of said slits being smaller than the thickness of the wall of said male mold; and (f) again heat-treating and hardening said male mold and making the wall sections near said slits of said male mold deform and crack into pieces, the pieces of said male mold being removed from said female mold to expose up the stripes impressed on the inner surface of said female mold by said male mold.

2. A method as claimed in claim 1, wherein in step (a), said male mold is hardened to a hardness of 60–65 HRC.

3. A method as claimed in claim 1, wherein in (c) step, the exertion of hydraulic pressure on the outer surface of said female mold forces said fitted male and female molds to go through a tapered eye hole so as to impress the stripes of the outer surface of said male mold onto the inner surface of said female mold.

4. A method as claimed in claim 1, wherein in (d) step, the anneal temperature is about 780° C.

5. A method as claimed in claim 1, wherein in step (e), at least two slits of said three longitudinal slits are close to each other.

6. A method as claimed in claim 1, wherein in step (f), the temperature in the heat-treating process is about 860° C.

7. A method as claimed in claim 1, wherein in step (f), after heat treating. said male mold is put into water at room temperature so as to speed the cracking of said male mold and harden said female mold.

8. A method as claimed in claim 1, wherein said male mold is made of highly carbonized steel which is easy to crack, such as SK3, while said female mold is made of flexible heat-resistant steel or middle carbonized steel.

* * * * *